United States Patent [19]

Theysohn et al.

[11] 4,350,652

[45] Sep. 21, 1982

[54] MANUFACTURE OF ELECTRICALLY CONDUCTIVE POLYOLEFIN MOLDINGS, AND THEIR USE

[75] Inventors: Rainer Theysohn, Ludwigshafen; Klaus Boehlke, Hessheim; Erhard Seiler, Ludwigshafen; Martin Welz, Bad Duerkheim, all of Fed. Rep. of Germany

[73] Assignee: BASF Aktiengesellschaft, Fed. Rep. of Germany

[21] Appl. No.: 254,937

[22] Filed: Apr. 16, 1981

Related U.S. Application Data

[63] Continuation of Ser. No. 107,903, Dec. 28, 1979, abandoned.

[30] Foreign Application Priority Data

Jan. 18, 1979 [DE] Fed. Rep. of Germany ....... 2901758

[51] Int. Cl.$^3$ ............................................... B29B 1/04
[52] U.S. Cl. .................................. 264/104; 264/105; 264/331.15; 264/349
[58] Field of Search .................... 264/104, 105, 331.15, 264/349

[56] References Cited

U.S. PATENT DOCUMENTS

| | | | |
|---|---|---|---|
| 3,615,841 | 10/1971 | Smith | 264/104 |
| 3,658,976 | 4/1972 | Slade | 264/105 |
| 3,733,385 | 5/1973 | Reddish | 264/105 |
| 3,760,495 | 9/1973 | Meyer | 264/104 X |
| 3,800,020 | 3/1974 | Parfet | 264/104 |
| 3,808,678 | 5/1974 | Kubo | 264/104 |
| 3,856,574 | 12/1974 | Amagi | 264/105 |
| 4,055,615 | 10/1977 | Ikeda | 264/105 |
| 4,102,974 | 7/1978 | Boni | 264/331 |
| 4,117,065 | 9/1978 | Tsien | 264/105 |
| 4,117,184 | 9/1978 | Stinger | 264/105 |

FOREIGN PATENT DOCUMENTS

| | | |
|---|---|---|
| 1054074 | 4/1959 | Fed. Rep. of Germany . |
| 1217071 | 5/1966 | Fed. Rep. of Germany . |
| 1454368 | 7/1969 | Fed. Rep. of Germany . |

*Primary Examiner*—Thomas P. Pavelko
*Attorney, Agent, or Firm*—Keil & Witherspoon

[57] ABSTRACT

A process for the preparation of finely divided polyolefin molding materials from 100 parts by weight of a polyolefin and from 0.01 to 30 parts by weight of an electrically conductive additive, with or without other additives, wherein the mixture of the finely divided polyolefin particles and the electrically conductive additives is brought to the crystallite melting point of the polyolefin by the heating effect of the mixing action, and is then brought to a temperature which is from 3° to 40° C. above the said crystallite melting point while being subjected to a defined mixing intensity, after which the mixture is either cooled within 120 seconds or is directly compression-molded.

6 Claims, No Drawings

MANUFACTURE OF ELECTRICALLY CONDUCTIVE POLYOLEFIN MOLDINGS, AND THEIR USE

This is a continuation of application Ser. No. 107,903, filed Dec. 28, 1979 now abandoned.

The present invention relates to a process for the manufacture of electrically conductive polyolefin moldings, which comprise (a) 100 parts by weight of a finely divided, partially crystalline polyolefin, which has a mean particle diameter of from 10 to 5,000 μm and an intrinsic viscosity [η], measured in decalin at 130° C., of from 0.5 to 15 and (b) from 0.01 to 30 parts by weight of an electrically conductive additive which has a maximum particle diameter of <200 μm and a mean particle diameter which is less than 1/25 of the mean particle diameter of the polyolefin (a), and has a melting point or softening point which is at least 50° C. higher than the melting point of the polyolefin (a), with or without (c) from 5 to 100 parts by weight of a fibrous additive which has a fiber diameter of <50 μm and a maximum length:width ratio of 1,000:1, and has a melting point above that of the polyolefin (a), and with or without (d) conventional amounts of conventional other additives and auxiliaries.

Such electrically conductive moldings can either be employed directly in the form of sheets or panels, or can be shaped further, for example by deep-drawing or by press-forming. The moldings possess good electrical conductivity and can also be employed as heating elements.

As a rule, metals are used to conduct electric current. However, there are cases where, for cost reasons, for reasons of better moldability, or because of the risk of corrosion or of chemical attack, it is advisable to use electrically conductive plastics. It is possible, for example, to employ very special monomers which are then polymerized. This method is very expensive. Besides, development in this field is far from complete, so that such products are not yet commercially available.

On the other hand, it is possible to incorporate inherently conductive additives homogeneously into non-conductive plastics and thereby achieve an electrically conductive compound. The higher the content of conductive additives, the higher is the electrical conductivity of the filled molding material; depending on requirements, the content of conductive additives is from 20 to 95 percent by weight. In preparing such molding materials, the polymer is melted on conventional extruders, internal mixers or screw kneaders, and the conductive additive is incorporated very homogeneously. Disadvantages of this process are the relatively high energy which has to be expended to melt the polyolefin and to mix the melt with the conductive additive, and the substantial technical effort and financial expense entailed in precise metering of the not inconsiderable amounts of conductive additives, which frequently tend to produce dust, and to cake. Furthermore, the electrically conductive molding materials thus produced are substantially more difficult to process, because of their high filler content. The process described is unsuitable for polymers which, because of their high molecular weight or because of partial crosslinking, are irreversibly damaged by the shearing forces which necessarily arise when incorporating the conductive additive.

It is an object of the present invention to provide a simple and inexpensive process for the manufacture of electrically conductive semi-finished products having good mechanical properties, which process avoids the above disadvantages of the prior art.

We have found that this object is achieved, according to the invention, by a method wherein, in a first process step (A) a finely divided molding material comprising the components (a) and (b), with or without (c) and/or (d), is produced by mixing the components (a) and (b), with or without (c) and/or (d), in a first stage (I), in a mixer (with or without supply or removal of heat), during which first stage (I), in a first sub-stage (I.1), the mixture is brought, at a mixing intensity of from 100 to 500 W/l of useful capacity, and within a period of from 2 to 50 minutes, from ambient temperature, which is below the crystallite melting point of the polyolefin (a) and is, in particular, room temperature, to the crystallite melting point of the polyolefin (a), and is immediately thereafter, in the course of a second sub-stage (I.2), subjected to a mixing intensity which is from 0.3 to 0.8 times as great as the mixing intensity in the first sub-stage (I.1) and is brought, within a period of from 0.2 to 20 minutes, from the crystallite melting point of the polyolefin (a) to a temperature which is from 3° to 40° C. above this, and, if appropriate, is immediately thereafter, in a third sub-stage (I.3), subjected to a mixing intensity which is from 0.5 to 1.0 times as great as the mixing intensity in the second sub-stage (I.2) and is kept for a period of from 0.2 to 10 minutes at the temperature reached in sub-stage (I.2) and immediately thereafter, in a second stage (II) is discharged from the mixer within a period of from 0.5 to 30 seconds and is either brought, within 120 seconds, to a temperature below the crystallite melting point of the polyolefin (a), or is directly processed further in a second process step (B), in which the finely divided molding material obtained from the first process step (A) is molded at above the crystallite melting point of the polyolefin (a), by a continuous or batch-type compression-molding process, under minimal shear, to give electrically conductive moldings having a specific conductivity of $>10^{-6}$ Ohm$^{-1}$cm$^{-1}$, preferably of $>10^{-3}$ Ohm$-1$ cm$^{-1}$.

For the purposes of the invention, finely divided partially crystalline polyolefins (a) are those which have a particle diameter of from 10 to 5,000, preferably from 100 to 2,000, μm, and have an intrinsic viscosity (measured by the method of DIN 53,728 in decalin at 130° C.) of from 0.5 to 15, preferably from 1 to 10. The polyolefins are preferably high density polyethylene (0.93 to 0.97 g/cm$^3$) and polypropylene, especially a polypropylene produced by the gas phase process as described, for example, in German Published Application No. DAS 1,217,071, as well as copolymers of ethylene and propylene, provided they are partially crystalline, and corresponding polymers containing up to 5 percent by weight of grafted-on acrylic acid.

For the purposes of the invention, polyolefins are regarded as partially crystalline if they exhibit one or more melting peaks on DSC analysis.

For the purposes of the invention, electrically conductive additives (b) are finely divided products which exhibit high electrical conductivities when in the compact form. Examples include powders of metals and metal alloys, having a maximum particle diameter of <200 μm, preferred diameter ranges being from 0.001 to 50 μm and especially from 0.01 to 10 μm, elementary carbon and carbon blacks, above all conductive carbon blacks having a primary particle size of down to 10 nm, and graphite having a maximum particle diameter of <200 μm, preferably <50 μm. The particle diameter of the conductive finely divided additive should in each case be less than 1/25, preferably less than 1/50, of the mean particle diameter of the polyolefin (a), and the melting point of the conductive additive should be at least 50° C. above the crystallite melting point of the olefin polymer (a). Mixtures of different electrically conductive additives may also be employed. From 0.01 to 30, preferably from 0.1 to 20, especially from 0.5 to 10, parts by weight of the additive (b) are used.

Fibrous additives (c) which may be used include glass fibers, mineral fibers, asbestos fibers, cellulose fibers, nylon fibers and polyester fibers. The fiber diameter should be <50 μm, preferably <20 μm, and the maximum length:width ratio should not exceed 1,000:1. Furthermore, the melting point or softening point of the fibrous additive should be above that of the polyolefin (a). From 5 to 100, preferably from 10 to 60, parts by weight of component (c) are used.

Examples of auxiliaries and additives (d) include inorganic and organic colored pigments, stabilizers, processing aids, eg. flow promoters, lubricants and mold release agents, fillers, adhesion promoters, compatibility promoters, wetting agents and blowing agents.

The finely divided molding materials, comprising (a) and (b), with or without (c) and/or (d), can be prepared, in process step (A), in a mixer in which the mixing vanes are at right angles to the mixer axis; such mixers are described, for example, in German Published Applications Nos. DAS 1,054,074 and DAS 1,454,368.

To produce the novel electrically conductive moldings in process step (B), the finely divided molding materials obtained in process step (A) are molded, by a continuous or batch-type compression-molding process, at from 5° to 150° C., preferably from 10° to 50° C., above the melting point of the polyolefin (a), and at pressures of from 10 to 800 bar; preferably from 200 to 500 bar, without employing shear, to give compact semi-finished products. For this purpose, heated presses of any type, into which the desired mold can also be inserted, are used. After the mold has been filled with the finely divided molding material (from process step (A)) and been heated to the desired press temperature, the press is closed and the selected pressure is maintained for a period of from 2 to 200, preferably from 5 to 100, seconds. The molding is then cooled, preferably whilst maintaining the same pressure. In the compression-molding process, a high pressure is coupled with a short press dwell time, and a low pressure with a longer press dwell time. In addition to the use of discontinuous presses, a continuous process, for example on a double belt press is also feasible. In every case, current conductors, for example in the form of a wire mesh, can simultaneously be embedded in, or pressed onto, the molding. In a further embodiment, reinforcing or decorative fabrics or webs are applied during the compression-molding process.

The mixing intensity in W/l of useful capacity in step (A) of the process according to the invention is defined as the energy uptake in Watt per liter of the volume which the components (a) and (b), with or without (c) and/or (d), occupy in the mixer.

Surprisingly, we have found that using the two-stage process according to the invention it is possible to obtain, even with small amounts of electrically conductive additive (b), a semi-finished product which exhibits good electrical conductivity. Further, it is surprising that the mechanical properties of this material, such as the tensile strength and flexural strength, are very advantageous. A precondition for achieving this is that, in the first process step (A), because of the special procedure employed, a finely divided molding material is produced, which contains the conductive additive (b) entirely in bonded form, and that thereafter, in the second process step (B), this finely divided molding material, which may or may not be in the form of sieved fractions, is converted to a semi-finished product, at temperatures above the crystallite melting point of the polyolefin (a) and under high pressures, whilst substantially avoiding shear.

The first step of the process described requires far less expensive apparatus, and consumes far less energy, than, for example, compounding the electrically conductive finely divided additive (b) with the polyolefin (a) on an extruder. Furthermore, the amount of additive (b) required for a given electrical conductivity is substantially less when using process stage 2, described above, than when employing a conventional procedure. In addition, the process has the advantage that it is possible to use even those polyolefins (a) which, because of partial crosslinking or ultra-high molecular weight, can, by conventional methods, only be processed with detriment to the material, if at all.

The electrically conductive semi-finished product can be employed, quite generally, for conducting electrical current in cases where metallic conductors cannot be employed, for example for cost reasons or because of corrosion hazards. Special applications include, inter alia, electrodes and electrolysis plates. Another application is to pass a current through the electrically conductive material in order to convert electrical energy into heat energy, for example by using the material in the form of heating elements.

The electrically conductive semi-finished product can also be molded subsequently, for example by deep-drawing, in which case the shearing forces should be kept very low.

The Examples which follow illustrate the above process.

EXAMPLE 1

(A) The starting material for the first process step (A) is a mixture of (a) 25 kg (corresponding to 100 parts by weight) of a finely divided polyethylene which has particles of diameter 250–2,000 μm, a mean particle diameter of 800 μm and an intrinsic viscosity $[\eta]$ of 4.8 and (b) 1.6 kg (corresponding to 4.6 parts by weight) of conductive carbon black (KETJEN-BLACK EC 10 from AKZO, Netherlands).

The above mixture is brought (1) in a first stage, in a mixer of 100 l useful capacity, as described in German Published Application No. DAS 1,454,368, without supply or removal of heat, (1.1) in a first sub-stage, at a mixing intensity of 230 W/l of useful capacity, and within a period of 10.5 minutes, from ambient temperature (=room temperature) to the crystallite melting point of the polyethylene (a), namely about 138° C.; immediately thereafter (1.2) in the course of a further sub-stage, the mixture is brought, at a mixing intensity which on average is 0.25 times as great as the mixing intensity in the first sub-stage (1.1), and within a period of 4 minutes, from the crystallite melting point of the polyethylene (a) to a temperature which is 32° C. above this, namely 170° C.; immediately thereafter (2) in a second process stage, the mixture is discharged from the mixer within a period of 5 seconds and is brought, within a period of 35 seconds, to a temperature, namely 80° C., which is below the crystallite melting point of the polyethylene (a).

The product obtained has a similar particle size distribution to that of the finely divided polyethylene (a) employed, is free-flowing and contains the conductive carbon black (d) in a completely bonded form, in which it does not rub off the particles.

(B) Sheets of size 150×70×4 mm were produced from the finely divided product obtained in (A), on a type JWK steam-heated press from Kanzler u. Söhne, Neustadt (Weinstrasse), Federal Republic of Germany. First, the loosely poured-in material was heated to 175° C. with the press open. When this temperature had been reached, compression-molding was started, and a pressure of 350 bar was applied for 10 seconds. The molding was then cooled to room temperature whilst maintaining the same pressure.

The sheets obtained were used to determine the specific conductivity, according to DIN 53,482, between the end faces of the sheet, which were 150 mm apart. Test specimens for measuring the tensile strength and flexural strength according to DIN 53,455 were also machined from the sheets. The results are summarized in Table 1.

EXAMPLE 2 (COMPARATIVE EXAMPLE)

For comparison, a homogeneous finely divided mixture was produced mechanically from components (a) and (b), specified in Example 1 (A), in a fluid mixer.

When the mixture obtained was processed further as described in 1 (B), it proved impossible to obtain a mechanically stable sheet. This furthermore proved impossible even at a higher temperature (200° C.) or higher pressure (500 bar), or with a longer press dwell time (up to 50 seconds).

EXAMPLE 3 (COMPARATIVE EXAMPLE)

The homogeneous mechanical mixture obtained in Example 2 was introduced into a type ZSK twin-screw kneader from Werner & Pfleiderer, in which it was melted at 270° C., mixed and extruded as a strand which was cooled and granulated.

The granulated material obtained, in which the conductive carbon black was substantially homogeneously dispersed in the polyethylene (a), was used, as described in Example 1 B, to produce sheets of size 150×70×4 mm, which were then tested as in Example 1 B. The results are shown in Table 1.

TABLE 1

| Pressed sheet from Example | Specific electrical conductivity [Ohm$^{-1}$·cm$^{-1}$] | Tensile strength [Nmm$^{-2}$] | Flexural strength [Nmm$^{-2}$] |
| --- | --- | --- | --- |
| 1 | 0.12 | 23.5 | 36.8 |
| 3 | 0.18 × 10$^{-11}$ | 17.4 | 34.6 |

EXAMPLE 4

(A) The starting material for the first process step (A) is a mixture of (a) 25 kg (corresponding to 100 parts by weight) of a finely divided polyethylene which has particles of diameter 250–2,000 μm, a mean particle diameter of 800 μm and an intrinsic viscosity [η] of 4.8 and (b) 0.51 kg (corresponding to 2.04 parts by weight) of graphite UF 2-99.5/99.9 from Graphit-Werk Kropfmühl AG, 8 000 Munich 33, Federal Republic of Germany, which has a maximum particle diameter of 5 μm and a mean particle diameter of 1.2 μm, the latter being 1/666 of the mean particle diameter of the polyethylene (a).

The above mixture is brought (1) in a first stage, in a mixer of 100 l useful capacity, as described in Example 1 A, without supply or removal of heat, (1.1) in a first sub-stage, at a mixing intensity of 196 W/l of useful capacity, and within a period of 7.5 minutes, from ambient temperature (=room temperature) to the crystallite melting point of the polyethylene (a), namely about 138° C.; immediately thereafter (1.2) in the course of a further sub-stage, the mixture is brought, at a mixing intensity which on average is 0.68 times as great as the mixing intensity in the first sub-stage (1.1), and within a period of 2.1 minutes, from the crystallite melting point of the polyethylene (a) to a temperature which is 12° C. above this, namely 150° C.; immediately thereafter (2) in a second process stage, the mixture is discharged from the mixer within a period of 5 seconds and is brought, within a period of 30 seconds, to a temperature, namely 82° C., which is below the crystallite melting point of the polyethylene (a).

The product obtained has a similar particle size distribution to that of the finely divided polyethylene (a) employed, is free-flowing and contains the graphite in a completely bonded form, in which it does not rub off the particles.

(B) The product obtained was converted to sheets of size 150×70×4 mm under the conditions described in Example 1 (B), and these sheets were tested as in Example 1 (B). The results are shown in Table 2.

EXAMPLE 5

(A) The starting material for the first process step (A) is a mixture of (a) 20 kg (corresponding to 100 parts by weight) of a finely divided polypropylene which is grafted with acrylic acid and has an acid number of 29, particle diameters of from 25 to 1,500 μm, a mean particle diameter of 500 μm, an intrinsic viscosity [η] of <4, and a melt flow index of 0.1 (2.16 kg/230° C.), (b) 1 kg (corresponding to 5 parts by weight) of KETJEN-BLACK EC 10 conductive carbon black (from AKZO, Netherlands), (c) 2 kg (corresponding to 10 parts by weight) of glass fibers made from E-glass, are finished with a silane-based adhesion promoter and have a fiber diameter of 10 μm and a mean length of 0.20 mm in the as-supplied state, and (d) 0.04 kg (corresponding to 0.2 part by weight) of Irganox 1010 (from Ciba-Geigy, Basel) as a relevant conventional additive or auxiliary, namely a stabilizer.

The above mixture is brought (1) in a first stage, in a mixer of 100 l useful capacity, as described in Example 1 A, without supply or removal of heat, (1.1) in a first sub-stage, at a mixing intensity of 282 W/l of useful capacity, and within a period of 11 minutes, from ambient temperature (=room temperature) to the crystallite melting point of the modified polypropylene (a), namely about 160° C.; immediately thereafter (1.2) in the course of a further sub-stage, the mixture is brought, at a mixing intensity which on average is 0.60 times as great as the mixing intensity in the first sub-stage (1.1), and within a period of 5.1 minutes, from the crystallite melting point of the acrylic acid-grafted polypropylene (a) to a temperature which is 14° C. above this, namely 174° C.; and immediately thereafter, (2) in a second stage, the mixture is discharged from the mixer within a period of 5 seconds and is brought, within a period of 80 seconds, to a temperature, namely 80° C., which is below the crystallite melting point of the grafted polypropylene (a).

The resulting finely divided product has a somewhat lower average particle size than that of the chemically modified polypropylene employed. All the conductive carbon black (b) employed, and at least 90% of the glass fibers (c) employed, are firmly bonded to the polypropylene; the mean glass fiber length in the product is 0.16 mm.

(B) The product obtained was treated as described in Example 1 B, except that the working temperature was 200° C., the maximum pressure 360 bar and the press dwell time 20 seconds at 200° C. The specific conductivity, tensile strength and flexural strength were measured, as described in Example 1 B, on the sheets of size 150×70×4 mm obtained. The results are shown in Table 2.

TABLE 2

| Pressed sheet from Example | Specific electrical conductivity [Ohm$^{-1}$.cm$^{-1}$] | Tensile strength [Nmm$^{-2}$] | Flexural strength [Nmm$^{-2}$] |
| --- | --- | --- | --- |
| 4 | $1.7 \times 10^{-2}$ | 24.2 | 35.0 |
| 5 | 0.16 | 32.8 | 45.1 |

As may be seen from the Table, the semi-finished product of the invention exhibits both good strength characteristics and a relatively high specific electrical conductivity (ie. low specific volume resistivity) even with small amounts of conductive additive.

We claim:

1. A process for the manufacture of electrically conductive polyolefin moldings, which comprise
   (a) 100 parts by weight of a finely divided, partially crystalline polyolefin, which has a mean particle diameter of from 10 to 5,000 μm and an intrinsic viscosity [η], measured in decalin at 130° C., of from 0.5 to 15 and
   (b) from 0.01 to 30 parts by weight of an electrically conductive additive which has a maximum particle diameter of <200 μm and a mean particle diameter which is less than 1/25 of the mean particle diameter of the polyolefin (a), and has a melting point which is at least 50° C. higher than the melting point of the polyolefin (a), wherein, in a first process step (A) a finely divided molding material comprising the components (a) and (b), is produced by mixing the components (a) and (b), in a first stage (I), in a mixer, during which first stage (I), in a first sub-stage (I.1), the mixture is brought, at a mixing intensity of from 100 to 500 W/l of useful capacity, and within a period of from 2 to 50 minutes, from ambient temperature, which is below the crystallite melting point of the polyolefin (a) and is, in particular, room temperature, to the crystallite melting point of the polyolefin (a), and is immediately thereafter, in the course of a second sub-stage (I.2), subjected to a mixing intensity which is from 0.3 to 0.8 times as great as the mixing intensity in the first sub-stage (I.1) and is brought, within a period of from 0.2 to 20 minutes, from the crystallite melting point of the polyolefin (a) to a temperature which is from 3° to 40° C. above this, and immediately thereafter, in a second stage (II), is discharged from the mixer within a period of from 0.5 to 30 seconds to provide free flowing powder of polyolefin having bonded thereto said conductive additive and is either brought, within 120 seconds, to a temperature below the crystallite melting point of the polyolefin (a), or is directly processed further in a second process step (B), in which the finely divided powder blend molding material obtained from the first process step (A) is molded at above the crystallite melting point of the polyolefin (a), by a compression-molding process, under minimal shear, to give electrically conductive moldings having a specific conductivity of $>10^{-6}\Omega^{-1}\text{cm}^{-1}$, preferably of $>10^{-3}\Omega^{-1}\text{cm}^{-1}$.

2. A process for the manufacture of electrically conductive polyolefin moldings as recited in claim 1 which comprises adding component (c), from 5 to 100 parts by weight of a fibrous additive which has a fiber diameter of less than 50 μm and a maximum length:width ratio of 1,000:1, and has a melting point above that of the polyolefin (a), which is combined with components (a) and (b) in said first process step (A).

3. A process for the manufacture of electrically conductive polyolefin moldings as recited in claim 1 or claim 2 which comprises adding component (d), conventional amounts of one or more conventional additives which are combined with components (a) and (b) in said first process step (A).

4. A process for the manufacture of electrically conductive polyolefin moldings as recited in claim 1, wherein the finely divided powder blend molding material, after sub-stage (I.2), is immediately, in a third sub-stage (I.3), subjected to a mixing intensity which is from 0.5 to 1.0 times as great as the mixing intensity in the second sub-stage (I.2) and is kept for a period of from 0.2 to 10 minutes at the temperature reached in sub-stage (I.2), before being discharged from the mixer in the second stage (II).

5. A process for the manufacture of electrically conductive polyolefin moldings as recited in claim 1, wherein the finely divided powder blend molding material, after the second stage (II), is first brought within a period of 120 seconds to a temperature below the crystallite melting point of the polyolefin (a) before being processed further in the second process step (B).

6. A process as recited in claim 3, wherein the conventional additives comprise pigments, stabilizers, flow promotors, lubricants, mold release agents, fillers, adhesion promotors, compatibility promotors, wetting agents and blowing agents.

* * * * *